(12) United States Patent
Bürgi et al.

(10) Patent No.: US 11,745,293 B2
(45) Date of Patent: Sep. 5, 2023

(54) LASER MACHINING TOOL

(71) Applicant: BYSTRONIC LASER AG, Niederönz (CH)

(72) Inventors: Fabian Raphael Bürgi, Schmitten (CH); Marco Curdin Bergamin, Stäfa (CH); Christian Kähr, Suhr (CH)

(73) Assignee: BYSTRONIC LASER AG, Niederoenz (CH)

( * ) Notice: Subject to any disclaimer, the term of this patent is extended or adjusted under 35 U.S.C. 154(b) by 0 days.

(21) Appl. No.: 17/907,423

(22) PCT Filed: Feb. 24, 2021

(86) PCT No.: PCT/EP2021/054528
§ 371 (c)(1),
(2) Date: Sep. 27, 2022

(87) PCT Pub. No.: WO2021/204456
PCT Pub. Date: Oct. 14, 2021

(65) Prior Publication Data
US 2023/0118821 A1   Apr. 20, 2023

(30) Foreign Application Priority Data

Apr. 6, 2020   (EP) .................................... 20168254

(51) Int. Cl.
*B23K 26/70* (2014.01)
*B23K 26/08* (2014.01)
*B23K 37/02* (2006.01)

(52) U.S. Cl.
CPC ........ *B23K 26/702* (2015.10); *B23K 26/0884* (2013.01); *B23K 37/0211* (2013.01)

(58) Field of Classification Search
CPC ............ B23K 37/0211; B23K 26/0884; B23K 26/702

(Continued)

(56) References Cited

U.S. PATENT DOCUMENTS 4,563,567 A * 1/1986 Geffroy .................. G02B 7/001
                                                         219/121.78
4,578,554 A * 3/1986 Coulter ................ B23K 26/042
                                                         219/121.79

(Continued)

FOREIGN PATENT DOCUMENTS

DE   112012006616 T5   4/2015
JP        H0570777 U   9/1993
WO       2015086724 A1 6/2015

OTHER PUBLICATIONS

International Search Report and Written Opinion, dated May 20, 2021, from PCT/EP2021/054528.

(Continued)

*Primary Examiner* — Jimmy Chou
(74) *Attorney, Agent, or Firm* — Workman Nydegger

(57) ABSTRACT

A laser machining tool is disclosed. The laser machining tool includes a machining device that has a movable carriage. A machining unit, which includes a machining head, is arranged on the movable carriage. The machining head is configured to direct a laser beam of laser light onto a workpiece to be machined. A flexible fibre cable for supplying the laser light from a laser light source is connected to the machining head. The machining unit can be moved linearly together with the machining head relative to the movable carriage. The flexible fibre cable is fixed to the machining unit with a first fixing means and fixed to the movable carriage with a second fixing means. The flexible fibre cable is freely movable for enabling a linear movement of the machining unit relative to the movable carriage in a predetermined guide plane between the first and second fixing means.

13 Claims, 3 Drawing Sheets

(58) Field of Classification Search
USPC .................................................. 219/121.78
See application file for complete search history.

(56) References Cited

U.S. PATENT DOCUMENTS

| | | | | |
|---|---|---|---|---|
| 4,675,502 A * | 6/1987 | Haefner | ................. | B25J 9/1684 901/3 |
| 4,812,641 A * | 3/1989 | Ortiz, Jr. | ................. | G01M 11/35 356/73.1 |
| 4,985,780 A * | 1/1991 | Garnier | ................. | B23K 26/127 219/121.68 |
| 5,122,635 A * | 6/1992 | Knodler | ............. | H05K 13/0465 219/121.78 |
| 5,293,023 A * | 3/1994 | Haruta | ................. | B23K 26/142 219/121.84 |
| 5,293,216 A * | 3/1994 | Moslehi | .............. | G03F 7/70483 356/600 |
| 5,347,528 A * | 9/1994 | Haruta | ............... | B23K 26/0648 219/121.64 |
| 5,643,477 A * | 7/1997 | Gullo | .................... | B23K 26/127 52/64 |
| 5,658,476 A * | 8/1997 | Gullo | .................... | B23K 26/706 219/121.82 |
| 5,698,121 A * | 12/1997 | Kosaka | ............. | B23K 26/0884 219/121.78 |
| 5,850,068 A * | 12/1998 | Peters | ................. | B23K 26/046 219/121.73 |
| 5,998,758 A * | 12/1999 | Moser | ................... | B23K 26/04 219/121.75 |
| 6,065,668 A * | 5/2000 | Natali | .................. | B23K 26/244 228/208 |
| 6,399,915 B1 * | 6/2002 | Mori | .................... | B23K 26/03 219/121.83 |
| 6,486,436 B1 * | 11/2002 | Shah | .................. | B23K 26/0823 219/161 |
| 6,528,761 B1 * | 3/2003 | Roos | .................... | B23K 26/04 219/121.73 |
| 6,680,461 B2 * | 1/2004 | Watanabe | ............. | B23K 26/04 219/121.79 |
| 7,038,165 B2 * | 5/2006 | Okuda | ............... | B23K 26/0884 219/121.78 |
| 7,220,939 B2 * | 5/2007 | Yamazaki | .......... | B23K 26/0892 219/121.74 |
| 9,073,147 B2 * | 7/2015 | Broger | ............... | B23K 26/1464 |
| 10,166,633 B2 * | 1/2019 | Wolf | .................... | B25J 19/0037 |
| 11,364,574 B2 * | 6/2022 | Bader | ................. | G05B 19/4061 |
| 11,583,951 B2 * | 2/2023 | Fahrni | ................. | B23K 26/032 |
| 2002/0017509 A1 * | 2/2002 | Ishide | ................ | B23K 26/0884 219/121.77 |
| 2002/0117485 A1 * | 8/2002 | Jones | ................... | B23K 26/60 219/121.64 |
| 2002/0134768 A1 * | 9/2002 | Akaba | ............... | B23K 26/0604 219/121.63 |
| 2002/0148821 A1 * | 10/2002 | Watanabe | ............. | B23K 26/04 219/121.84 |
| 2003/0173344 A1 * | 9/2003 | Hermann | ............... | B23K 26/40 219/121.64 |
| 2003/0226835 A1 * | 12/2003 | Bell | ..................... | B23K 26/702 219/121.61 |
| 2004/0206735 A1 * | 10/2004 | Okuda | .................. | B23K 26/04 219/121.78 |
| 2005/0150876 A1 * | 7/2005 | Menin | ............... | B23K 26/0884 700/166 |
| 2005/0194367 A1 * | 9/2005 | Fredrick, Jr. | .......... | B23K 26/38 219/121.78 |
| 2005/0258152 A1 * | 11/2005 | Kawamoto | ........... | B23K 26/21 219/121.62 |
| 2007/0000883 A1 * | 1/2007 | Jung | ...................... | B23K 26/22 219/121.78 |
| 2007/0075054 A1 * | 4/2007 | Nakamura | ............. | B23K 26/04 219/121.61 |
| 2007/0199929 A1 * | 8/2007 | Rippl | ................. | B23K 26/0884 219/121.78 |
| 2007/0278194 A1 * | 12/2007 | Hoelsher | ............. | G02B 6/4296 219/121.6 |
| 2008/0035619 A1 * | 2/2008 | Hamaguchi | ........... | B25J 9/1664 219/121.79 |
| 2008/0172143 A1 * | 7/2008 | Schwarz | .............. | B23K 26/082 219/121.61 |
| 2010/0147810 A1 * | 6/2010 | Campana | ........... | B23K 37/0235 219/121.67 |
| 2013/0119025 A1 * | 5/2013 | Lee | ...................... | B23K 26/244 219/121.64 |
| 2014/0183167 A1 * | 7/2014 | Ryu | ...................... | B23K 10/022 219/87 |
| 2014/0263221 A1 * | 9/2014 | Minehara | ................. | G21F 9/28 219/121.73 |
| 2014/0346155 A1 * | 11/2014 | Jurca | .................... | B23K 26/032 219/121.81 |
| 2015/0158124 A1 * | 6/2015 | Kino | ..................... | B23K 26/08 219/121.6 |
| 2016/0059347 A1 * | 3/2016 | Kogel-Hollacher | ........................ B23K 26/082 219/121.73 |
| 2016/0059350 A1 * | 3/2016 | Schoenleber | .......... | B23K 26/04 219/121.81 |
| 2019/0061054 A1 * | 2/2019 | Mizuno | ................. | B25J 9/1684 |

OTHER PUBLICATIONS

International Preliminary Report on Patentability, dated Jul. 29, 2022, from PCT/EP2021/054528.

* cited by examiner

LASER MACHINING TOOL

Laser machining tools are used to machine workpieces, e.g. to cut sheet metal, using high-energy laser light. For this purpose, a machining unit is provided which is mounted on a movable carriage and which has a machining head that generates a laser beam for machining the workpiece from laser light. To change the position of the machining head, the machining unit can be moved relative to the movable carriage.

The laser light is usually supplied to the machining head of a laser machining tool via a fibre cable. The fibre cable is connected to the machining head and from there, using energy chains known per se, which also guide other operating lines for the tool, is conducted to a laser light source which radiates the laser light into the fibre cable.

The document WO 2015/086724 A1 shows a laser machining tool according to the preamble of claim 1. In this tool, the fibre cable is guided from a movable cross carriage to a machining unit with a laser head via an energy chain that extends above the cross carriage in the vertical direction and causes the fibre cable to be deflected by 180°. Since a fibre cable has a large minimum bending radius compared to other lines in the laser machining tool, the energy chain also has a large bending radius and, as a result, a large vertical and horizontal extension, which enlarges the laser machining tool. Furthermore, the length of the fibre cable is increased due to the large bending radius of the energy chain. Since the length of the fibre cable for guiding laser light with high powers is limited, this leads to less flexibility in the arrangement of the fibre cables in the laser machining tool and less flexibility of the laser source outside the machining tool.

The document US 2010/0147810 A1 shows a laser cutting tool in which laser light is supplied to a movable cutting head via a fibre cable that is deflected by means of an energy chain that runs in the horizontal direction.

Document DE 11 2012 006 616 T5 discloses a fibre laser beam machine including a machining head that condenses a laser beam and irradiates the laser beam on a work piece as well as a fibre that guides the laser beam output from a laser oscillator to the machining head. The machine further comprises a fibre connector that fixedly joins the fibre to the machining head and a cable holding device that is flexible, has a U shape and houses the fibre. Furthermore, a fixing section fixedly joins the cable holding device to the machining head.

Document JP H05 70777 U discloses a laser processing machine having an optical fibre fixing mechanism for an optical fibre extending from a laser oscillator to a condensing optical unit. The optical fibre is guided along a robot via an elastic rod of the optical fibre fixing mechanism so that the fibre flexibly follows the movement of the robot.

The object of the invention is to create an improved laser machining tool and a correspondingly improved machining device which allow the fibre cable to be guided to the machining head in a simple and space-saving manner.

This object is achieved by the laser machining tool according to claim 1 and the machining device according to claim 13. Further developments of the invention are defined in the dependent claims.

The laser machining tool according to the invention contains a machining device with a movable carriage on which a machining unit which has a machining head is arranged. The machining head is designed in such a way that, when the laser machining tool is in operation, it directs a laser beam of laser light onto a workpiece to be machined. The laser machining tool is preferably a laser cutting tool for cutting workpieces and, in particular, sheets or tubular bodies made of metal. In this case, the machining head is a cutting head, the laser beam of which cuts the corresponding workpiece.

In the laser machining tool according to the invention, a flexible fibre cable is connected to the machining head of the machining unit in order to supply the laser light from a laser light source. The machining unit can be moved linearly together with the machining head relative to the movable carriage and preferably in the vertical direction. For example, laser light from a high-power fibre laser with a power in the range from 2 kW to 20 kW is guided in the fibre cable. The inner diameter of the fibre cable is preferably in the range of 100 µm. In one embodiment, the laser light guided in the fibre is short-wave, non-visible laser light.

In the laser machining tool according to the invention, the fibre cable is fixed to the machining unit with a first fixing means and fixed to the movable carriage with a second fixing means, wherein the fibre cable is freely movable for enabling a linear movement of the machining unit relative to the movable carriage in a predetermined guide plane between the first and second fixing means. No further fixing means are therefore provided for rigidly securing the fibre cable between the first and the second fixing means.

In the laser machining tool according to the invention, guide means defining the predefined guide plane are provided in order to restrict movement of the fibre cable in a direction running perpendicular to the predetermined guide plane. The guide means comprise at least two parallel stop elements for the fibre cable. At least one stop element is preferably formed by a wall section. Alternatively or additionally, at least one stop element can also be formed by one or more rods and/or wires.

Additionally to the guide means, the fibre cable can have sufficient rigidity so that the movement of the fibre cable in the predetermined guide plane is guaranteed by the fibre cable itself.

The laser machining tool according to the invention has the advantage that simple and space-saving guidance of the fibre cable between the movable carriage and the machining unit is achieved through the free movability of the fibre cable between corresponding fixings in a guide plane. In particular, the length of the fibre cable can be shortened and the flexibility in the arrangement of the fibre cable and correspondingly the laser source can be increased.

In a preferred embodiment, the fibre cable is guided in the predetermined guide plane with a maximum deflection of 179° between the first and second fixing means. The term maximum deflection by 179° is to be understood in such a way that the extension direction of the fibre cable starting from any point on the fibre cable between the first and second fixing means (including these fixing means) along the path of the fibre cable to any other point between the first and second fixing means (including these fixing means) rotates about an angle which is at most 179°. As a result, the fibre cable can be further shortened, which is extremely advantageous in particular with high laser powers in the range from 10 kW.

In a preferred embodiment of the laser machining tool according to the invention, the fibre cable is guided in the predetermined guide plane with a maximum deflection of 120°, in particular 100°, between the first and second fixing means. In other words, the extension direction of the fibre cable starting from any point on the fibre cable between the first and second fixing means (including these fixing means) along the path of the fibre cable to any other point between the first and second fixing means (including these fixing means) rotates about an angle which is at most 120° or at most 100° or at most 90°. This enables the fibre cable to be further shortened.

In a further preferred embodiment, only the fibre cable is fixed with the first and second fixing means. This prevents other lines from interfering with the fibre cable along its extension between the first and second fixing means.

In a further preferred embodiment, in the operating position of the laser machining tool, i.e. when the tool is set up as intended for its operation, the fibre cable runs substantially in the vertical direction at the location of the first fixing means and/or runs substantially in the horizontal direction at the location of the second fixing means. In this way, a particularly space-saving guiding of the fibre cable between the movable carriage and the machining unit can be achieved.

In a further preferred embodiment, the predetermined guide plane extends perpendicular to the bridge or the longitudinal extent thereof.

The first or second fixing means can ensure a rigid fastening of the fibre cable to the machining unit or to the movable carriage in an arbitrary way. In a preferred embodiment, the first fixing means and/or the second fixing means each have a clamping device for clamping the fibre cable at the corresponding fixing position.

In a further preferred embodiment, an energy chain known per se, which is also referred to as an energy guide chain or drag chain, is provided between the movable carriage and the machining unit. In this energy chain, lines other than the fibre cable are guided from the movable carriage to the machining unit. These lines include lines required for the operation of the machining unit or the machining head, such as one or more hoses for supplying compressed air or gas (for example nitrogen and/or oxygen) required for laser machining and/or one or more lines for supplying coolant or water and/or one or more signal cables and/or one or more power cables.

Since the energy chain of the embodiment just described does not contain a fibre cable with a large minimum bending radius, the energy chain can have significantly smaller bending radii, which enables a significantly more compact structure. The energy chain is preferably arranged in such a way that, in the operating position of the laser machining tool, it extends vertically upwards from the movable carriage, is then deflected by 180° and then extends downwards into the machining unit in the vertical direction.

In a further, particularly preferred embodiment, in the operating position of the laser machining tool, the carriage is movably guided on the bridge, wherein the bridge is movable perpendicular to the carriage. This enables a very flexible arrangement of the machining unit in relation to the workpiece to be machined. The movable carriage can preferably be moved along the bridge in the horizontal direction and the bridge can also be moved in the horizontal direction perpendicular to the travel path of the carriage.

In addition to the laser machining tool according to the invention, the invention relates to a machining device for such a laser machining tool. This machining device is configured for guiding on a bridge and contains a movable carriage, i.e. a carriage which is configured for movement on the bridge. A machining unit is arranged on the carriage, which has a machining head, which is designed in such a way that, when using the machining device in the laser machining tool, it directs a laser beam of laser light onto a workpiece to be machined, wherein a flexible fibre cable for supplying the laser light from a laser light source is connected to the machining head and the machining unit can be moved linearly together with the machining head relative to the movable carriage.

In the machining device according to the invention, the fibre cable is fixed to the machining unit with a first fixing means and fixed to the movable carriage with a second fixing means, wherein the fibre cable is freely movable for enabling a linear movement of the machining unit relative to the movable carriage in a predetermined guide plane between the first and second fixing means. Furthermore, guide means defining the predefined guide plane are provided in order to restrict movement of the fibre cable in a direction running perpendicular to the predetermined guide plane. The guide means comprise at least two parallel stop elements for the fibre cable.

The machining device according to the invention is thus configured to work as a machining device for the laser machining tool according to the invention. In a preferred embodiment, this machining device is also configured to work as a machining device for a laser machining tool according to one or more of the preferred embodiments of the laser machining tool described above. In other words, features of the preferred embodiments of the laser machining tool described above can be implemented in the machining device, provided the features relate to the machining device.

An exemplary embodiment of the invention is described in detail below with reference to the accompanying figures.

A variant of the invention is described below using a laser machining tool 100 in the form of a laser cutting tool, the overall structure of which can be seen in FIG. 3. The laser machining tool is used to cut metal sheets using a machining device via which a high-energy laser beam is directed onto the metal sheets.

Figure 1:
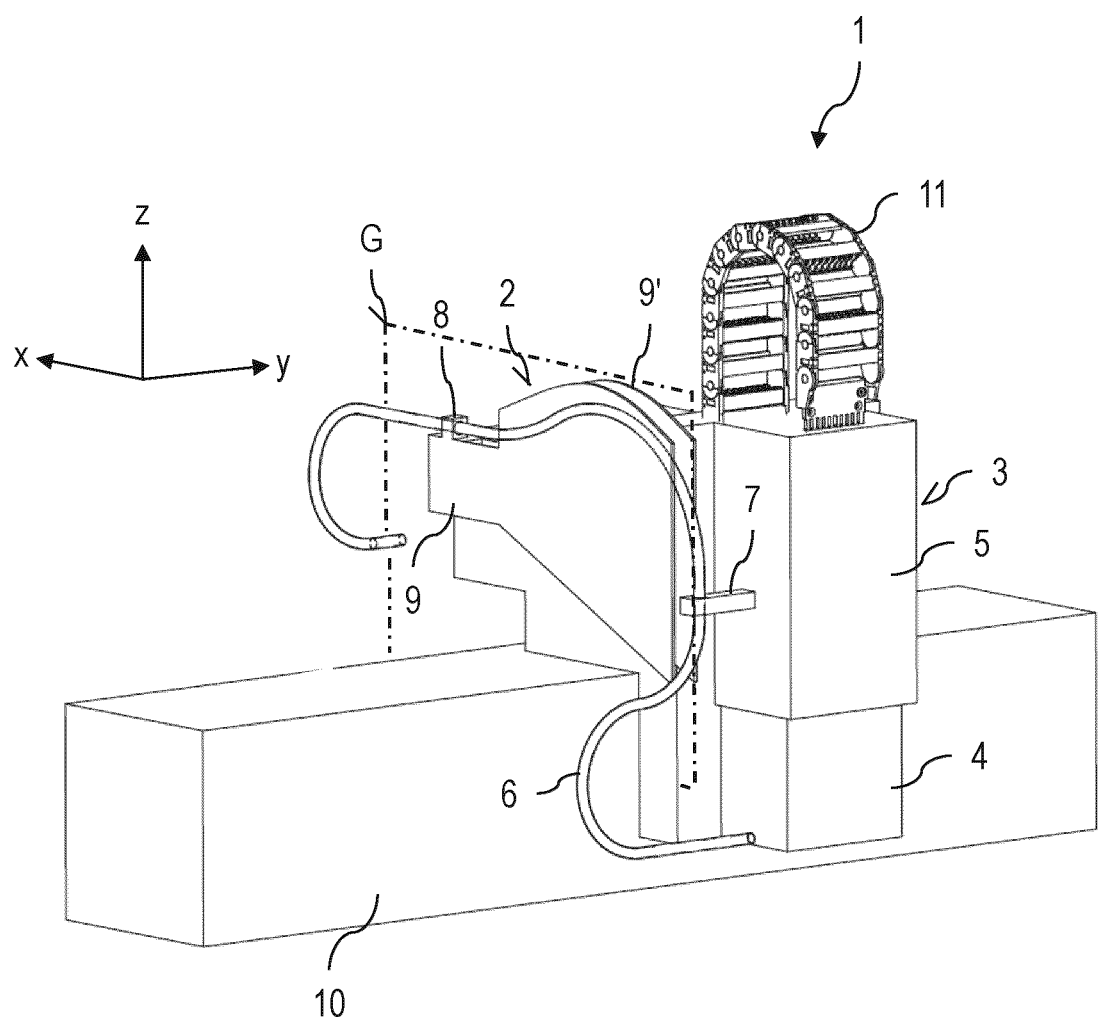
FIG. 1 shows a schematic perspective illustration of a machining device which is installed in an embodiment of the laser machining tool according to the invention, wherein the machining head is in a first vertical position.

FIG. 1 shows in detail the machining device, which is designated as a whole by the reference symbol 1. This device comprises a movable carriage 2 which, in the embodiment described here, is designed as a cross or cutting carriage and supports a machining unit 3. Corresponding to the Cartesian coordinate system shown in FIG. 1, the machining unit 3 can be moved in the vertical z-direction relative to the carriage 2 by means of an actuator system (not shown), as will be explained further below. The carriage 2 is arranged on a bridge 10 which, in the embodiment described here, represents a cutting bridge and only a partial section of which is shown in the view of FIG. 1. The carriage 2 can be moved along this bridge by means of an actuator system (not shown) in the horizontal y-direction according to the coordinate system shown.

Figure 3:
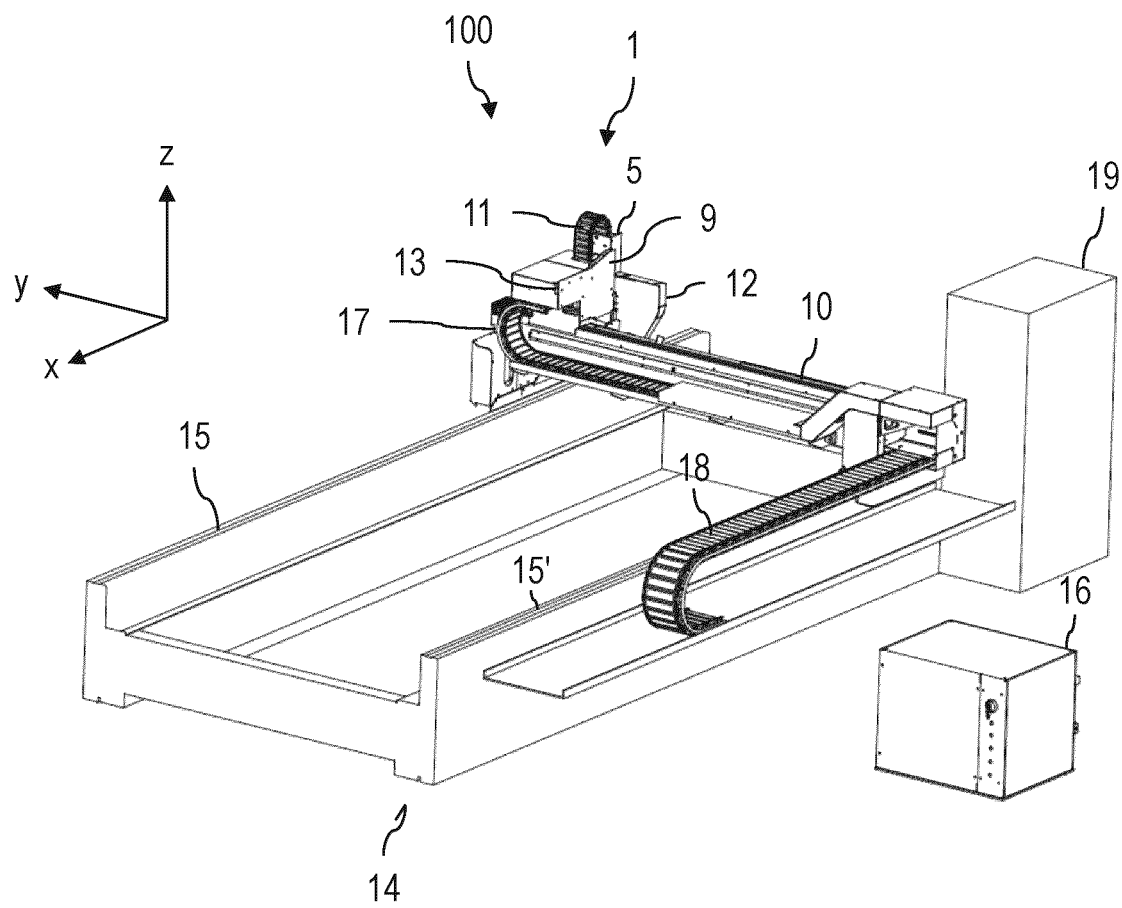
FIG. 3 shows a schematic perspective overall view of the laser machining tool in which the machining device from FIGS. 1 and 2 is installed.

As can be seen from the overall view of the laser machining tool according to FIG. 3, the bridge 10 can also be moved, specifically in the horizontal x-direction of the coordinate system shown, i.e. perpendicular to the path of the carriage 2. For this purpose, the bridge is arranged on a frame 14 with two supports 15 and 15' extending in the y-direction. The bridge lies on these supports and can be moved along their longitudinal direction using suitable actuators (not shown).

According to FIG. 1, the machining unit 3 comprises a machining head 4 which, in the embodiment described here, is designed as a cutting head and to which a fibre cable 6 is connected, via which laser light is supplied to the machining head. The laser light originates from a laser light source which is designated by reference symbol 16 in FIG. 3. In the machining head 4, there is an optical system which generates a laser beam from the laser light which is guided into the machining head 4 via the fibre cable 6 and which is directed downwards. The sheet metal to be cut (not shown), which is positioned between the supports 15 and 15' of the frame 14 according to the illustration in FIG. 3, is located below the machining head during operation of the laser machining tool.

In addition to the fibre cable 6, the machining head 4 is supplied in a manner known per se with further lines that are required for its operation. These lines, which are not shown for reasons of clarity, include, inter alia, electrical lines for power supply, control cables and hoses for supplying compressed air and the gas required for the cutting process. The lines are guided separately to the fibre cable 6 from the carriage 2 to the machining head 4 via an energy chain 11 known per se.

The energy chain 11 extends upwards in the z direction and is also referred to as a Z drag. In this chain, the cables described above are guided over a large number of flexible links. Starting from the carriage 2, the lines run vertically upwards into the Z drag, which deflects the lines by 180° and then guides them vertically downwards into a housing 5 of the machining unit 3, which is above the machining head 4. The energy chain 11 enables the lines guided therein to be shifted by changing their bending position when the machining head 4 or the machining unit 3 moves relative to the carriage 2.

In contrast to the embodiment described here, in conventional machining devices, the fibre cable 6 is supplied together with the other lines to the machining head 4 via the energy chain 11. It is disadvantageous here that the fibre cable generally has a significantly larger minimum bending radius than the other lines guided in the energy chain. Accordingly, the bending radius of the energy chain 11 must be set to the relatively large minimum bending radius of the fibre cable, which increases the vertical expansion of the energy chain. A machine roof that is usually provided must therefore be arranged at a greater height, which entails increased costs. In addition, the guiding of the fibre cable in the Z drag results in a greater length of this cable. Since certain fibre cable lengths must not be exceeded for the correct operation of the machining head 4, the scope for designing the laying of the fibre cable and, accordingly, the positioning of the laser source—because of the limited fibre length for the transmission of laser light with high power—is limited. In addition, longer fibre cables lead to increased manufacturing costs. Due to the absence of the fibre in the Z drag, it can be made smaller, as described above, which leads to a shortening of all cables and/or hoses guided therein. This can save additional costs.

In order to eliminate the above problems, in the embodiment described here, the fibre cable 6 is guided separately from the Z drag 11 to the machining head 4. Starting from the machining head 4, the fibre cable initially runs out of the machining head 4 in the horizontal y-direction and is then bent by 180° before it is rigidly fixed to the housing 5 of the machining unit 3 by means of a first fixing means 7, which is only indicated schematically. A fastening element known per se can be used as the fixing means 7; for example, a clamping device can be provided. The cable is then guided from the first fixing means 7 to a second fixing means 8, which is also only indicated schematically and can, for example, again be implemented by a clamping device. The second fixing means 8 is provided on the carriage 2 and thus ensures that the fibre cable is rigidly attached to the carriage.

An essential feature of the machining device of FIG. 1 is that the fibre cable 6 is freely movable between the first fixing means 7 and the second fixing means 8 without further fixing and in particular without an energy chain in a guide plane G parallel to the x-z plane of the coordinate system shown. In this way, a movement of the fibre cable during the vertical displacement of the machining unit 3 relative to the carriage 2 is made possible. However, in order to avoid undesired movement of the fibre cable when the carriage 2 is moved rapidly in the y-direction, the movement of the fibre cable between the fixing means 7 and 8 is limited with the aid of guide means 9 and 9', which in the embodiment described here represent two parallel wall sections. The guide means form stop elements between which the fibre cable extends from the fixing means 7 to the fixing means 8. The guide means are part of the carriage 2 and run parallel to one another in planes which in turn are parallel to the x-z plane of the coordinate system shown. The fixing means 8 is located in the rear region of an upper edge of the guide means 9.

To protect the fibre cable 6, a cladding is also provided to the left of the machining head 4 and the housing 5. This cladding covers part of the fibre cable on its path from the machining head 4 to the guide means 9 and 9'. The cladding can be seen in FIG. 3 and is designated there by reference symbol 12. In order to make the cable guiding visible, the cladding has been omitted from the illustration in FIGS. 1 and 2.

Figure 2:
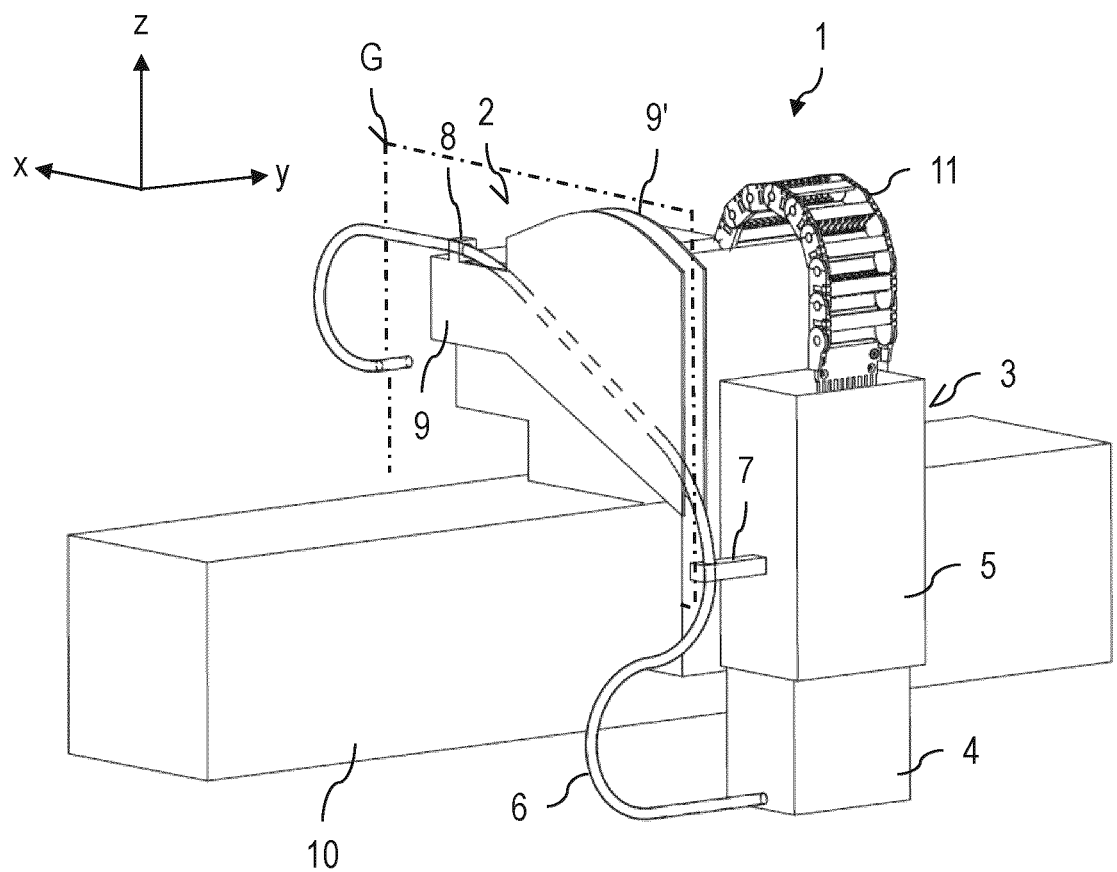
FIG. 2 shows an illustration analogous to FIG. 1, wherein the machining head is in a second vertical position which is lower than the first vertical position from FIG. 1.

In FIG. 1, the machining unit 3 or the machining head 4 is arranged in a first upper vertical position relative to the carriage 2. During the cutting process or the emitting of laser light by means of the machining head, the machining unit 3 is moved downwards together with the machining head 4 into a second, lower vertical position, which is indicated in FIG. 2. As can be seen in this figure, the machining head 4 is now located below the bridge 10, which is not the case in the position of FIG. 1. The vertical movement of the machining unit 3 is made possible with suitable actuators and vertical guiding of the machining unit on the carriage 4.

The vertical movement of the machining unit 3 into the position of FIG. 2 leads to a downward displacement of the first fixing means 7, which in turn leads to a stretching of the fibre cable 6 between the two fixing means 7 and 8. The free movement of the fibre cable between the fixing means can thus compensate for the change in the distance between the two fixing means. The extension of the fibre cable 6 between the guide means 9 and 9' is illustrated in FIG. 2 by a dashed representation of the cable.

According to the embodiment of FIGS. 1 and 2, the fixing means 7 and 8 fix the fibre cable 6 in such a way that it runs in the horizontal direction at the location of the fixing means 8 and in the vertical direction at the location of the fixing means 7. In this way, it is achieved that the fibre cable 6 is deflected by an angle which is significantly smaller than 180°. In other words, the extension direction of the fibre cable 6 rotates starting from any point on the fibre cable between the fixing means 7 and 8 along the path of the fibre cable to any other point between the fixing means 7 and 8 about an angle that is significantly smaller than 180°. In this way, a short cable guiding is made possible between the carriage 2 and the machining head 4.

FIG. 3 again shows, in a schematic illustration, the overall structure of the laser machining tool 100, which contains the machining device 1 described above. In the illustration of FIG. 3, the laser machining tool is shown from a perspective which illustrates the cable guiding along the bridge 10 and the frame 14. From this perspective, the machining device 1 is positioned behind the bridge 10 and is partially covered thereby. Accordingly, the machining head 4, which is located behind the bridge 10, cannot be seen from FIG. 3. However, a part of the housing 5 as well as the Z drag 11 and the guide means or the wall section 9 by which the movement of the fibre cable is limited can be seen. In addition, the cladding 12 can be seen, in which a part of the fibre cable is located. For the sake of clarity of illustration, neither the fibre cable nor other lines are shown in FIG. 3.

According to FIG. 3, the fibre cable leaves the carriage 2 via a slot 13 behind the fixing means 8, which is not shown in FIG. 3. The fibre cable is then bent so that it enters an energy chain 17 which extends in the horizontal y-direction and is also referred to as a Y drag. The other lines that reach the machining head 4 via the Z drag 11 are also guided within this energy chain in a manner known per se. The energy chain 17 ensures that the lines or cables received therein are fed in when the carriage 2 is moved. From the Y drag, the cables pass via cable channels known per se, which are not explained in more detail here, to a further energy chain 18, which is also referred to as an X drag, and ensures the cables contained therein are fed in when the bridge 10 is moved in the x-direction. After leaving the X drag, the cables are guided either to a control cabinet 19 for controlling the laser machining tool or to the laser light source 16 already mentioned above, depending on their function. This cable guiding is not shown in FIG. 3 and is also not relevant for the invention.

The embodiment of the invention described above has a number of advantages. In particular, the fact that the minimum bending radius of the fibre cable is significantly larger than the minimum bending radius of other lines that reach the machining head via a Z drag is taken into account by separately guiding the fibre cable to the machining head. As a result, the vertical height of the Z drag can be reduced by reducing its bending radius when this drag is not guiding a fibre cable. In addition, by suitably fixing the fibre cable at two fixing points on the machining unit or on the carriage, the cable can be deflected by less than 180°, which enables shorter cable lengths. This in turn leads to lower costs as well as greater design freedom in cable guiding and the positioning of the laser source.

LIST OF REFERENCE SYMBOLS

100 Laser machining tool
1 Machining device
2 Movable carriage
3 Machining unit
4 Machining head
5 Housing
6 Fibre cable
7 First fixing means
8 Second fixing means
9, 9' Guide means
10 Bridge
11 Z drag
12 Cladding
13 Slot
14 Frame
15, 15' Frame support
16 Laser light source
17 Y drag
18 X drag
19 Control cabinet
G Guide plane

The invention claimed is:

1. A laser machining tool comprising:
a machining device which is guided on a bridge and has a movable carriage, on which a machining unit is arranged, wherein the machining device includes a machining head, which is configured to direct a laser beam of laser light onto a workpiece to be machined, wherein a flexible fibre cable for supplying the laser light from a laser light source is connected to the machining head and the machining unit can be moved linearly together with the machining head relative to the movable carriage,
wherein the flexible fibre cable is fixed to the machining unit with a first fixing means and fixed to the movable carriage with a second fixing means,
wherein the flexible fibre cable is freely movable for enabling a linear movement of the machining unit relative to the movable carriage in a predetermined guide plane between the first and second fixing means, and
wherein guide means defining the predetermined guide plane are provided in order to restrict movement of the flexible fibre cable in a direction running perpendicular to the predetermined guide plane, the guide means comprising at least two parallel stop elements for the flexible fibre cable.

2. The laser machining tool according to claim 1, wherein the flexible fibre cable is guided in the predetermined guide plane with a maximum deflection of 179° between the first and second fixing means.

3. The laser machining tool according to claim 2, wherein the flexible fibre cable is guided in the predetermined guide plane with a maximum deflection of 120°, between the first and second fixing means.

4. The laser machining tool according to claim 1, wherein only the flexible fibre cable is fixed with the first and second fixing means.

5. The laser machining tool according to claim 1, wherein, in the operating position of the laser machining tool, the flexible fibre cable runs substantially in the vertical direction at the location of the first fixing means and/or runs substantially in the horizontal direction at the location of the second fixing means.

6. The laser machining tool according to claim 1, wherein the predetermined guide plane extends perpendicular to the bridge.

7. The laser machining tool according to claim 1, wherein at least one stop element is formed by a wall section and/or at least one stop element is formed by one or a plurality of rods and/or wires.

8. The laser machining tool according to claim 1, wherein the first fixing means and/or the second fixing means each have a clamping device for clamping the flexible fibre cable.

9. The laser machining tool according to claim 1, wherein an energy chain is provided between the movable carriage and the machining unit, wherein, in the energy chain, lines other than the flexible fibre cable are guided from the movable carriage to the machining unit.

10. The laser machining tool according to claim 1, wherein the carriage is movably guided on the bridge, wherein the bridge can be moved perpendicular to the carriage.

11. The laser machining tool according to claim 2, wherein the flexible fibre cable is guided in the predetermined guide plane with a maximum deflection 100°, between the first and second fixing means.

12. A machining device for a laser machining tool, wherein the machining device is configured for guiding on a bridge and contains a movable carriage, on which a machining unit is arranged, wherein the machining unit includes a machining head that is configured such that, when using the machining device in the laser machining tool, the machining unit directs a laser beam of laser light onto a workpiece to be machined, wherein a flexible fibre cable for supplying the laser light from a laser light source is connected to the machining head and the machining unit can be moved linearly together with the machining head relative to the movable carriage, wherein the flexible fibre cable is fixed to the machining unit with a first fixing means and fixed to the movable carriage with a second fixing means, wherein the flexible fibre cable is freely movable for enabling a linear movement of the machining unit relative to the movable carriage in a predetermined guide plane between the first and second fixing means, and wherein guide means defining the predetermined guide plane are provided in order to restrict movement of the flexible fibre cable in a direction running perpendicular to the predetermined guide plane, the guide means comprising at least two parallel stop elements for the flexible fibre cable.

13. The machining device according to claim 12, wherein the machining device is configured to work as a machining device for a laser machining tool according to claim 2.

* * * * *